3,185,492
TOOL HOLDING MEANS
Harry R. Dziedzic, Chicago, Ill., assignor to Scully-Jones and Company, Chicago, Ill., a corporation of Illinois
Filed Sept. 5, 1961, Ser. No. 135,810
15 Claims. (Cl. 279—44)

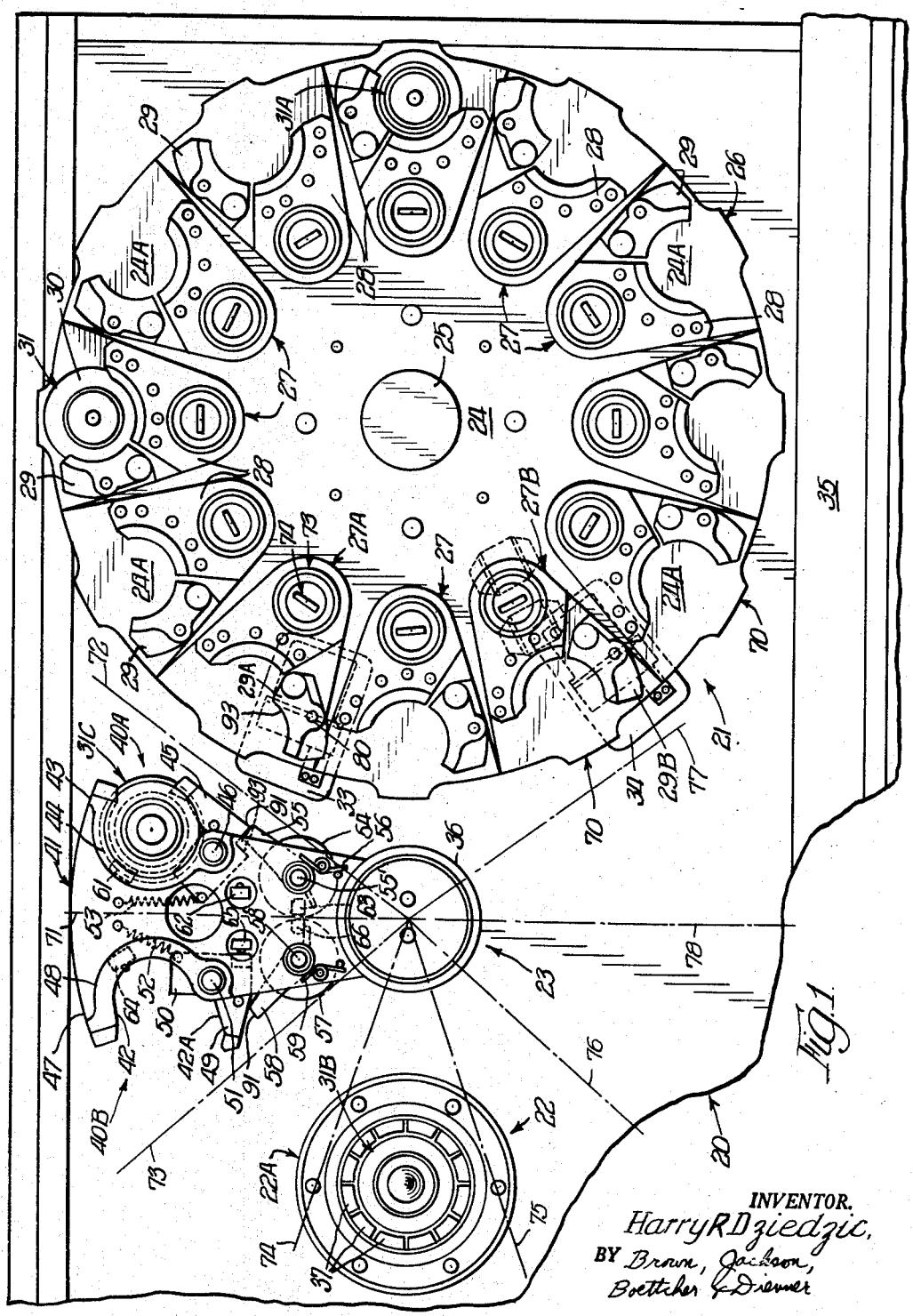

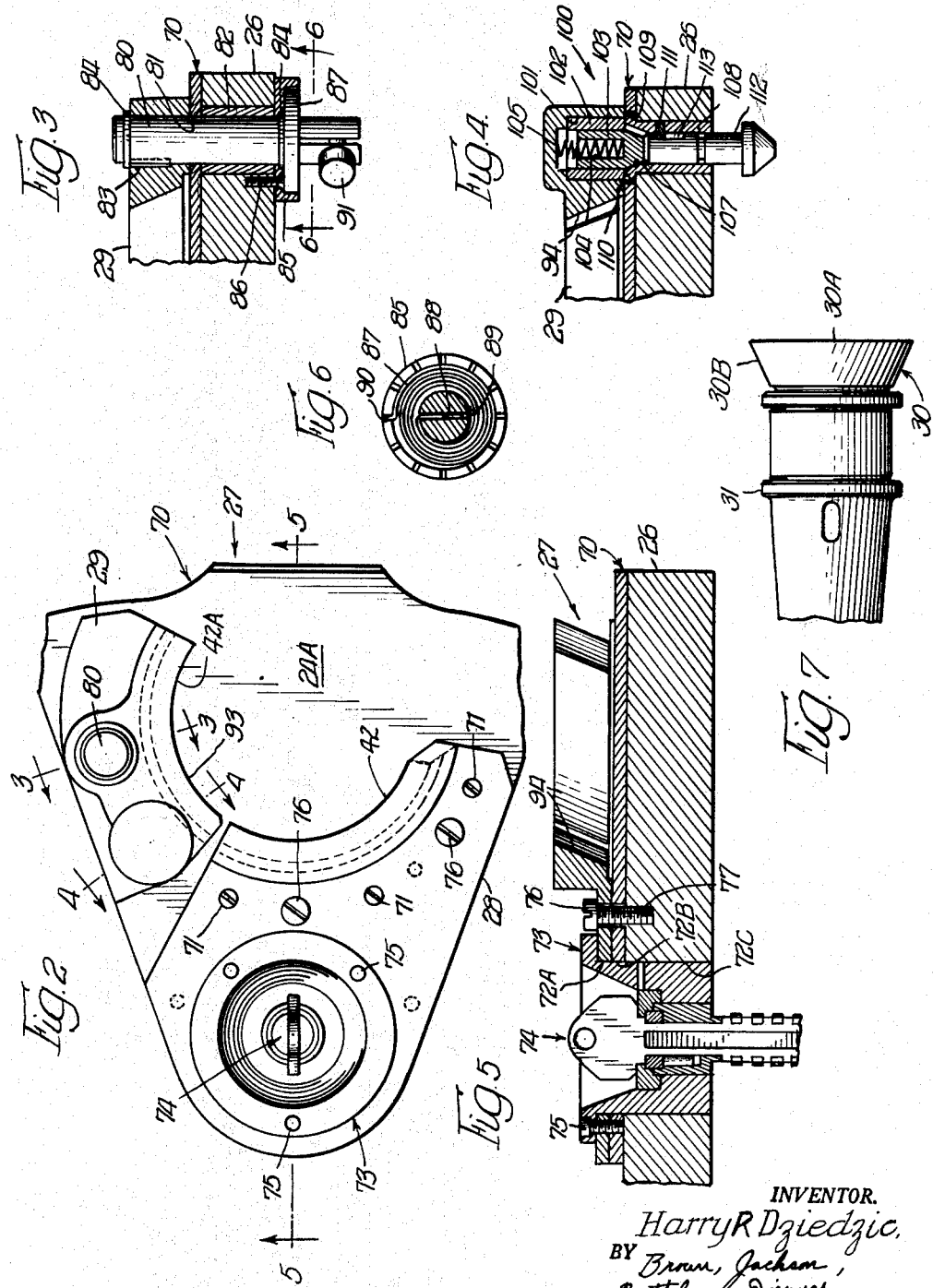

My invention pertains to tool holding means and particularly such means for use in connection with a tool matrix for the storage of tools.

In automatic tool changing systems in which a machine tool is provided with a series of tools at a tool storage station, or matrix, which tools are to be interchanged automatically in some selected order between the tool storage station and a work station, it is essential that the individual tool holding means for a tool at the storage station should have a firm hold on the tool. It is just as essential, however, that the tool holding means be adapted quickly to accept or release a tool so that delays in tool interchange are minimized.

It is important that the tool holding means be able to receive and hold tools having some variation in dimensions. Also, it is desirable in automatic tool changing that some indication be given when the holding means at the matrix is able to receive a tool.

Accordingly, it is an object of my invention to provide tool holding means which maintains a secure hold on the tool, but which is enabled upon the occurrence of a preselected signal, or action, to release the tool for transfer to the work station.

It is a further object of my invention to provide tool holding means which quickly receives, and secures a firm hold on, a tool presented to it for storage. To this end, I prefer to provide the tool holding means with a self-latching mechanism.

It is another object of my invention to provide a tool holding means so constructed as to adapt itself to variations in dimensions of the tool while yet being able to provide a secure hold on any tool presented to it.

Other objects, uses and advantages of my invention will become apparent, or be obvious, from the following specification, particularly when considered in connection with the drawing in which:

FIGURE 1 is a fragmentary front elevational view of the mechanical structure of a data controlled machine tool in which my invention is adapted to be used;

FIGURE 2 is an enlarged plan view of a tool holding means illustrated in FIGURE 1;

FIGURE 3 is a sectional view on the line 3—3 of FIGURE 2;

FIGURE 4 is a sectional view on the line 4—4 of FIGURE 2;

FIGURE 5 is a sectional view on the line 5—5 of FIGURE 2;

FIGURE 6 is a sectional view on the line 6—6 of FIGURE 3; and

FIGURE 7 is a fragmentary view, on reduced scale, of a type of tool holder adapted to be retained in the tool holding means, or cartridge, of FIGURE 2.

Referring now to FIGURE 1, the mechanical portions of a data controlled machine tool are shown, said machine tool being indicated generally by the reference numeral 20. The machine tool comprises a tool storage station, or matrix, 21, a work station 22 which in the illustrated form includes chuck 22A, and tool transfer means 23 for transferring tools between the work station 22 and the storage station 21. The work station 22, and specifically the chuck used therein, is described, together with a form of tool holder, in the copending application of Edward Hain, Serial No. 134,990, filed August 30, 1961, now abandoned, to which reference may be had for further operational and structural details. In general, the tool storage station 21 comprises a tool matrix 24 mounted for rotation upon a shaft generally indicated at 25. The tool matrix 24 includes a base plate 26 upon which a plurality of individual tool holder cartridges 27 are mounted. In the illustrated construction there are 12 of the individual tool holder cartridges 27, each of which has a flat locating surface, or face 24A. It should be understood, however, that any desired number of cartridges may be included in the tool holder matrix 24 depending upon the capacity desired for the machine tool and the space available on the matrix.

Each of the matrix cartridges 27 comprises a tool clamp structure including a fixed clamp member 28 and a movable clamp member 29. The movable member 29 is pivotally mounted upon the base plate 26 and is actuatable between a closed position, as illustrated for most of the cartridges 27 in FIGURE 1, and an open position as shown in the case of cartridge 27A. In the closed position, the two clamp members 28 and 29 clamp the end portion 30 of a tool holder 31 to hold the tool holder in mounted position in the matrix. When pivoted to the open position, as illustrated in the cartridge 27A, however, the movable clamp member 29 permits release of the tool holder 31.

As may be seen in FIGURE 7, the tool holder 31 comprises a frusto-conical end portion 30 adapted to be engaged by mating tapered spring fingers 37 of the chuck 22A. End 30 comprises a flat surface, or face, 30A, perpendicular to the axis of the tool holder 31 and a tapered surface 30B extending inwardly toward the axis of the tool holder. These surfaces assist in positioning the tool holder 31 either in the chuck or in the tool holding means of the matrix 21, such as the cartridges 27.

Only two tool holders 31 and 31A are shown mounted in the matrix 24 in FIGURE 1. However, it should be understood that in normal use most, or all, of the cartridges 27 would be utilized to mount a tool holder in the matrix. It will be appreciated that in lieu of using a tool holder, such as tool holder 31 or 31A, a tool might itself be formed with an end portion comparable to that indicated by the numeral 30 on the tool holders 31 and 31A. Therefore, when the term "tool" is used in the claims, it will be understood that it indicates either a tool, or a tool holder, or a workpiece, or the like.

A suitable mechanism is provided in the storage station 21 to release the tool holders mounted in the matrix in order to permit their transfer to the chuck 22A at the work station 22. As shown in FIGURE 1, two such release mechanisms 33 and 34 are employed in the transfer system of FIGURE 1. Each of the cartridge release mechanisms 33 and 34 may be utilized to open any one of the cartridges 27 and these release mechanisms establish two transfer locations for the tool storage station 21 and are mounted in fixed position on the frame 35 of the machine. The release devices may be solenoid actuated or may be operated by any other desired mechanism.

The work station 22 of the machine illustrated in FIGURE 1 may be conventional in construction. This portion of the machine tool 20 comprises a chuck 22A mounted on a suitable spindle, and a tool holder 31B is shown mounted in the chuck. Means are provided for rotating the spindle and chuck 22A, and for moving the chuck axially, in the course of a machine operation. Inasmuch as the mechanism for advancing and retracting the chuck 22A and for driving the chuck and spindle rotationally, during the machining operation, may be conventional and does not comprise a part of the present invent, the details of this mechanism are not illustrated in the drawings.

The transfer mechanism 23 comprises a transfer arm 41 mounted by a hub portion 36 upon a shaft for pivotal movement. Adjacent the upper end of the arm 41 are a pair of tool carrying means 40A and 40B which are arranged to have their openings face in opposite directions. Tool carrying means 40A comprises a tool grasping means or clamp 43, including a fixed clamp member 44, which may be an integral part of the transfer arm, and a movable clamp member 45 that is pivotally mounted on the transfer arm by a pin 46. A tool holder 31C is shown clamped in the tool grasping means or clamp 43. A second tool grasping means, or clamp, 47 is included in the transfer arm structure and is shown in open position. This second clamp comprises a fixed clamp member 48, similar to the clamp member 44, and a movable clamp member 49 that is pivotally mounted upon a pin 51. The clamp member 49 is held in its open position, and is normally biased toward that position, by suitable means such as a spring 52. A similar spring 53 is provided to bias the movable member 45 of the clamp 43 toward its open or released position. The springs 52 and 53 are adapted to be connected to pins carried by the arm member 41 and each of them at their opposite ends are connected to ends of the clamping members 49 and 45, respectively. The tool grasping means, or clamps, 43 and 47 have an arcuate wall surface 42 on their fixed clamp members 44 and 48, respectively. Each of the movable clamp members 45 and 49 has an arcuate surface 42A which, when it is in closed position causes the respective clamps 43 and 47 to fit about a tool holder, or tool, more than 180°. It will be observed also that each of the movable clamp members 45 and 49 has an abutment portion 50 and the clamp members are normally biased toward their open positions.

The transfer mechanism further includes means, mounted on the transfer arm 41, for latching the clamps 43 and 47 in closed position. With respect to the clamp 43 this means comprises a rotary solenoid 54 that is mounted on the transfer arm 41 and which is provided with a rotary armature member, or arm, 55, which is adapted to engage the movable clamp member 45, and is mounted on pivot pin 55'. A spring 56 biases the latching arm, or armature, 55 toward movement in a counterclockwise direction, as viewed in FIGURE 1. However, the spring 56 moves the latching arm 55 to latching position only when a tool holder has engaged the abutment portion 50 of the movable clamp member 45 and rotated it toward closing position. A similar rotary solenoid 57 having an armature or latching arm 58, mounted on pivot pin 58' and engaging the movable clamp member 49, is provided on the opposite side of the transfer arm. A biasing and holding spring 59 is employed to hold the latching arm 58 in latched position. It will be observed, however, from clamp 47 as an example, that when the movable clamp member 49 is in open position, the spring loaded latching arm 58 engages the movable clamp member 49 at such a location that its pressure is exerted substantially along a line passing through, or near, the pivot point 51 and hence will not cause the movable clamp member 49 to be moved to closed position.

It will be further observed that each of the latching arms 55 and 58 has a tapered end 91 which is adapted to engage the surface of a latching notch such as the latching notch 93 on the movable clamp member 45. The tapered surface 91 not only provides a camming action against the movable latch member 45, for example, but, additionally, affords some accommodation for variations in the diameter of the tools, or tool holders, which are to be grasped. Since the area of engagement between the tapered end 91 of the latching arms 55 or 58 with respect to the movable clamp members 45 and 49, respectively, constitutes an end contact with the latching arms, and since the urging of the springs 53 and 52 of the movable clamping members 45 and 49 to open position will be exerted along a line through the contact at the ends 91 of the latching arms 55 and 58 and through, or closely near, the pivotal axes 55' and 58', the latching arms cannot be dislodged by the springs from their latching position except when the latching arms are moved by their respective solenoid structures 54 and 57. It will be appreciated, therefore, that if the solenoid structures should fail to operate in the manner intended, the clamps 43 and 47, in their closed position, provide a "fail-safe" arrangement.

There are three sensing switches included in the transfer mechanism 23 in association with the clamp 43. A first sensing switch 61 (see FIG. 1) is used to indicate whether a tool holder, or tool, is disposed within the clamp or jaw 43. A second sensing switch 62 affords a positive indication that the movable jaw member 45 is in position to permit the clamp 43 to receive a tool holder. A third sensing switch 63 is used to afford a positive indication that the latch member 55 is in fully open or released position. Three similar sensing switches 64, 65 and 66 are used to determine the operating conditions of the other transfer clamp 47, said switches being mounted in positions corresponding to those of switches 61, 62 and 63, respectively.

Referring now more particularly to FIGURE 2, there is shown on enlarged scale a cartridge, or tool holding means, 27 constructed in accordance with its preferred form. While the movable clamp member 29 and the fixed clamp member 28 of the cartridge could be mounted directly on the base plate 26 of matrix 24, I prefer to provide the cartridge in the form of a unit which may be conveniently and more quickly mounted to the base plate of the matrix. Accordingly, I employ a mounting plate 70 which has a configuration at its wider end corresponding to the outer configuration of the base plate 26. The fixed clamp member 28 is secured to plate 70 by screws 71. Through the fixed clamp member 28 and mounting plate 70 there extend aligned openings 72A and 72B (FIG. 5) which are adapted to be aligned with a correspondingly shaped opening 72C in the base 26 to receive the housing 73 for a tool identification structure indicated generally by the reference numeral 74. Such tool identification structure is disclosed in detail in the copending application of Myron L. Anthony, Serial No. 79,272, filed December 29, 1960, and since it does not form a portion of the present invention, is not here described in any detail.

Housing 73 for the tool identification means is secured by screws 75 to the mounting plate 70. Screws 76 passing through apertures in the flange portion of fixed clamping member 28 and the mounting plate 70 and into threaded openings 77 in the base plate 26 serve to hold the clamping mechanism and the tool identification means 74 to the base plate 26.

When the mounting plate 70 is mounted to the base plate 26, the pivot pin 80 for the movable clamp member 29 is inserted through the opening 81 in the mounting plate 70 and through the bore of the bearing 82 which is secured in the base plate 26. A slot and key connection, indicated at 83, connects the movable clamp member 29 with the pivot pin 80 for joint rotation. Snap-on retainer rings 84 are disposed on the pivot pin 80 adjacent the top surface of clamp member 29 and below the base plate 26 within the recess in the spring retaining member 85 which is secured to the underside of the base member 26 by screws 86, thereby also serving to maintain the bearing 82 within the base plate 26. As may be best seen from FIGURES 3 and 6, a helical spring 87 has one end 88 secured in the split end 89 of the pivot pin 80, and the other end of the spring is secured in a slot 90 in the spring retainer 85. The spring is adjusted to urge the movable clamp member 29 toward its open position. Also secured adjacent the lower end of pivot pin 80 is a switch actuating member 91 which is adapted to actuate a switch mechanism (not shown) to give a signal when the movable clamp member 29 is in open position and the tool holding cartridge 27 is ready to receive a tool holder.

For convenience of illustration, no tool holder is shown disposed in the cartridge 27 of FIGURE 2, but it will be readily seen from a consideration of FIGURE 2 and FIGURE 1 that, when a tool holder is inserted by the transfer arm 41 into a cartridge, such as cartridge 27A of FIGURE 1, engagement of the tool holder with the surface 93 of the movable clamp member 29A (FIG. 1) will cause the movable clamp member 29A to move clockwise (FIG. 1) to its closed position wherein the movable clamp member and fixed clamp member together engage and encircle the tool holder more than 180° and therefore retain it in position against the mounting plate 70. As can be most easily seen in FIGURES 3, 4, and 5, the movable clamp member 29 and the fixed clamp member 28 have inwardly tapered surfaces 94 which correspond to the taper of the frusto-conical surface 30B of the end portion 30 of the tool holder 31, as can be best seen in FIGURE 7. Consequently, as a tool holder is inserted in the cartridge 27, the mating tapered surfaces of the clamp members 28 and 29 and the surface 30B of the tool holder 31 serve to cam the tool holder into position wherein its flat surface 30A seats against the flat surface, or face, 24A of the mounting plate 70.

When a tool holder, such as tool holder 31 of FIGURE 7, has been inserted into the cartridge 27 of FIGURE 2, it is retained therein by reason of a self-latching mechanism indicated generally by the reference numeral 100, and best shown in FIGURE 4. This self-latching mechanism comprises a bore 101 in the movable clamp member 29 in which there is disposed a sleeve 102. Within sleeve 102 there is disposed, for reciprocating movement, a plunger or latch member 103 having a bore 104 for carrying the lower end of a spring 105. The spring urges the latch member, or plunger, 103 toward a recess or aperture 107 formed in the cylindrical member 108. Member 108 has a flange 109 at its upper end which seats in an opening 110 in the mounting plate 70. The cylindrical member 108 is carried in the base plate 26 of the matrix 24 and itself carries a pin 111 which forms a guide and also a means of limiting movement of the actuator pin 112 which has a slot 113 cooperating with the guide pin 111. It will be observed that the lower end of the latching member 103 has a tapered frusto-conical shape. This shape is adapted to cooperate with the tapered recess 107 in the cylindrical member 108. It will be noted, however, that the recess 107 has a matching frusto-conical shape slightly larger than that of the lower end of latching member 103 so as to permit lateral movement of the end of the latching member 103 in the recess in response to the urging of the spring 105 in order to cam the movable clamp member 29 in a direction toward a tool holder which is being embraced by the clamping member. In this way, slight variations in the size or shape of the tool holder may be accommodated and the tool holder firmly held in tight engagement. The angles of taper of the recess 107 and of the lower end of the latching member 103 are such that when interengaged they are in a locking relationship and cannot be cammed loose from each other by rotation of the movable clamp member 29.

At such time during the operation of an automatic tool transferring operation, wherein the tool and tool holder are to be removed from the cartridge 27, actuating pin 112 is moved against the latching member 103 to raise it, against the action of the spring 105, to the level of the top surface of mounting plate 70. Movement of pin 112 is caused by the release mechanism 33 or 34 (FIG. 1) which may be solenoid operated or actuated by some other mechanism in response to a suitable signal. Movement of the tool holder out of the cartridge 27 then causes the movable clamp member 29 to be pivotally moved to open position whereupon the tool is released and moved away and the spring member 87 keeps the movable clamp member 29 in its open position. The electrical control system for sensing various positions of different portions of the structure and for effecting the various described operations and signals may be found in the above mentioned copending application of Myron L. Anthony, Serial No. 79,272.

In considering the operation of the above described mechanism, it may be first assumed that the transfer arm 41 is located in the position shown in FIGURE 1 but with both of the jaws, or clamps, 43 and 47 open. Furthermore, it may be assumed that a tool holder 31C is clamped in the cartridge 27A located at the first transfer location of the storage station 21 in alignment with the release mechanism 33, and that this particular tool is the one desired for use during the next operating cycle of the machine. Under these conditions the transfer arm 41 is rotated in a clockwise direction to bring the open jaw 43 into alignment with the tool holder mounted in the receptacle 27A. The position of the transfer arm 41, at this time, is generally indicated by the dash line 72, indicating a first transfer position for the transfer arm 41, the initial position of the transfer arm being indicated by the corresponding dash line 71.

When the transfer arm 41 moves to the transfer position 72, as described hereinabove, the movable clamp member 45 is pivoted in a counter-clockwise direction about the pin 46 by reason of engagement of the tool holder 31C with the abutting portion 50 of clamp member 45. Furthermore, the sensing switch 61 is actuated to indicate the presence of a tool holder in the clamp 43. The spring 56 then moves the latching arm 55 into latching position as shown in FIGURE 1 so that the tool holder 31C is gripped in the clamp 43. The switch 62 is de-actuated upon movement of the latching arm, or armature, 55 to latched position. Thereafter, the release mechanism 33 is actuated to open the movable clamp member 29A of the cartridge 27A, releasing the tool holder so that it can be moved out of the cartridge 27A by the transfer arm. The transfer arm 41 then pivots in a counter-clockwise direction to a third or storage position generally indicated by the dash line 73. Of course, the position 73 may be made coincident with the initial position 71, but the described arrangement is usually preferred because it avoids ambiguity with respect to the starting and storage positions in the transfer operation.

After a tool holder such as the tool holder 31C has been picked up from the tool matrix 24, and after the transfer arm is moved to the storage position 73, it may be held in that position for some period of time pending completion of a machining operation already in process. When the new tool held in the clamp 43 is to be mounted in the work station, the chuck 22A is first retracted from its working position and spindle rotation is interrupted.

The transfer arm 41 is then pivoted further in a counter-clockwise direction to the transfer position 74, at which position the other clamp or tool grasping means 47 on the transfer arm 41 engages the tool holder 31B already present in the chuck 22A. When the clamp has engaged this tool holder, as sensed by the switches at 64, 65 and 66, the chuck is actuated to release the tool holder, after which the transfer arm moves to its next operating position, as indicated by the dash line 75, taking the tool holder 31B from the chuck with it. With the transfer arm in the position indicated by the dash line 75 the tool holder held in the clamp 43 is aligned with the chuck 22A and the chuck is actuated to engage this tool holder. The manner of such actuation is set forth in detail in the copending application of Edward Hain, Serial No. 134,990, filed August 30, 1961.

When this is accomplished, the clamp 43 is released by actuating the rotary solenoid 54 to pivot the armature, or latching arm, 55 out of engagement with the movable clamp member 45.

After the new tool has been mounted in the chuck 22A, as described above, the transfer arm 41 is rotated further in a counter-clockwise direction to the position indicated by the dash line 76. When this movement of arm 41 from position 75 occurs, the tool holder held in chuck 22A causes the movable clamp member 45 to open and then spring 53 retains the member 45 in open position. The transfer arm is held in the position 76, which is a storage position similar to position 73, until the control system (not shown) determines which cartridge 27 is to receive the tool. When this determination has been made, the arm 41 is again rotated counter-clockwise, bringing the old tool held in the clamp 47 into alignment with an empty tool holder cartridge 27B, as indicated by the position line 77, at the second transfer position of the matrix 24, which position is indicated by the location of the release mechanism 34. The cartridge 27B, and specifically the movable clamp member 29B thereof, is actuated to grip the tool, once it has been brought into mounting position relative to the cartridge 27B. Thereafter the latching arm 58 on arm 41 is released by actuation of the solenoid 57. When the transfer arm 41 is moved to a waiting position generally indicated by the dash line 78 and corresponding to the initial position 71, except that it is rotated 180° relative thereto, then the tool holder retained at cartridge 27B causes the movable clamp member 49 to be opened and spring 52 keeps it open. At this point the two clamps of the transfer mechanism 23 are both empty and both open.

In the next tool changing cycle, the same operations take place except in reverse. The transfer arm 41 is first moved counter-clockwise from position 78 to position 77 to pick up a tool in a tool holder from a tool cartridge at the position of the cartridge 27B in FIGURE 1. In this instance the tool is grasped in the tool grasping means, or clamp 47 of the transfer mechanism. When the tool holder is so clamped in the clamp 47, the cartridge at the transfer location indicated by cartridge 27B is released, after which the transfer mechanism 23 moves to the storage position 76. The transfer arm waits in the position 76 until a tool change is required, at which time it moves to the position 75 to pick up the tool presently in the chuck 22A at the work station 22. After picking up the old tool, the transfer arm 41 moves to the transfer position 74 to deposit the new tool in the work station. Thereafter, the transfer arm rotates in a clockwise direction to its position 72 to replace in the matrix 24 the tool that has already been used. When this operation is completed the transfer arm moves to the initial position 71 and waits at that position until it is again necessary to pick up a new tool.

While a preferred embodiment of my tool transfer means has been described and illustrated, it will be appreciated that modifications and changes may be made therein by those skilled in the art, particularly with my disclosure before them, and hence I do not intend to be limited to the particular disclosure, except insofar as the appended claims are so limited.

I claim:

1. Tool holding means for a tool having a surface portion tapered toward its axis, said tool holding means comprising a supporting base member, a fixed tool retaining member secured to said supporting base and adapted to engage the surface portion of the tool, movable tool retaining member movably supported on said base for pivotal movement toward open and closed positions and adapted to engage the surface portion of the tool, said movable and fixed tool retaining members having tapered surface portions adapted to mate with the tapered surface of the tool and urge said tool into engagement with said supporting base member, and latching means acting between said supporting base member and said movable tool retaining member to hold the latter in closed position, said latching means comprising a spring loaded plunger carried by one of said latter two members and a recess in the other of said latter two members.

2. The tool holding means of claim 1 together with means for normally biasing said movable tool retaining member toward open position.

3. The tool holding means of claim 1 wherein the spring loaded plunger is carried by the movable tool retaining member and the recess is defined by wall means in said supporting base member.

4. The tool holding means of claim 3 wherein the plunger has a surface and the recess has a co-operating surface with one of said surfaces providing a camming action, whereby movement of the plunger into the recess causes said movable tool retaining member to be carried in a direction to engage a tool.

5. The tool holding means of claim 4 wherein the plunger has an end portion constituting the frustum of a cone and the recess is correspondingly tapered but shaped to permit sideways movement of said plunger in said recess, and wherein the angles of taper cause the latching means to be self-locking.

6. The tool holding means of claim 3 together with means for moving said plunger out of said recess whereby said biasing means urges said movable tool retaining member towards open position.

7. The tool holding means of claim 6 wherein the means for moving said plunger comprises a slidable pin supported in said supporting base member.

8. The tool holding means of claim 6 wherein the pivotally mounted movable tool retaining means carries switch actuating means.

9. Tool holding means for a tool having at its rear end a surface portion tapered toward its axis as it extends forwardly for assisting in positioning of the tool, said tool holding means comprising means defining a recess having a tapered surface portion matable with and for receiving the tapered surface portion of the tool for positioning it in the recess, movable means engageable with a surface portion of the tool when the tool is inserted into said recess for securing the tool in said recess.

10. The tool holding means of claim 9 wherein the movable means has a tapered surface portion which bears against a mating tapered surface portion of the tool and the tool is adapted to be cammed into seated position in said recess by a tapered surface portion of the tool holding means.

11. The tool holding means of claim 9 wherein the movable means includes latching means spring loaded toward the latched position.

12. The tool holding means of claim 11, together with means for selectively releasing the latching means.

13. For use in connection with a tool holding matrix adapted to have a plurality of tool holding means, tool holding means comprising a fixed arcuate clamping member, and a movable arcuate clamping member pivotally mounted adjacent said fixed member and pivotal between open and closed positions, said members when in closed position being adapted to encircle a tool more than 180 degrees for clamping the latter in the tool holding means.

14. For use in connection with a tool holding matrix adapted to have a plurality of tool holding means, tool holding means comprising a fixed arcuate clamping member, and a movable arcuate clamping member pivotally mounted adjacent said fixed member and pivotal between an open position wherein an end portion of said movable member nearest said fixed member is disposed in the path of a tool which is to be inserted in said tool holding means and a closed position wherein said fixed and movable members are adapted to encircle a tool more than 180 degrees for clamping the latter in the tool holding means, whereby when a tool is inserted in said tool holding means said tool will engage said end of said movable member and pivot said movable member to its closed position.

15. The combination of claim 14 wherein self-latching means is provided for automatically latching said movable member in its closed position, and wherein spring means is provided for biasing said movable member toward its open pivotal position.

References Cited by the Examiner
UNITED STATES PATENTS 3,052,011  9/62  Brainard _____ 29—26

FOREIGN PATENTS 758,135  9/56  Great Britain.

RICHARD H. EANES, Jr., *Primary Examiner.*
WHITMORE A. WILTZ, *Examiner.*